(12) United States Patent
Misra et al.

(10) Patent No.: US 12,502,779 B2
(45) Date of Patent: Dec. 23, 2025

(54) METHOD AND APPARATUS FOR IMPROVED SAMPLING-BASED GRAPH GENERATION FOR ONLINE PATH PLANNING BY A ROBOT

(71) Applicant: Omron Corporation, Kyoto (JP)

(72) Inventors: Gaurav Misra, San Ramon, CA (US); Akihiro Suzumura, San Ramon, CA (US); Andres Rodriguez Campo, San Ramon, CA (US); Sean Bailey, San Ramon, CA (US); John Drinkard, San Ramon, CA (US)

(73) Assignee: OMRON CORPORATION, Kyoto (JP)

( * ) Notice: Subject to any disclaimer, the term of this patent is extended or adjusted under 35 U.S.C. 154(b) by 340 days.

(21) Appl. No.: 18/128,399

(22) Filed: Mar. 30, 2023

(65) Prior Publication Data

US 2024/0326247 A1    Oct. 3, 2024

(51) Int. Cl.
*B25J 9/16*       (2006.01)
*G05B 19/4061*    (2006.01)

(52) U.S. Cl.
CPC ........ *B25J 9/1666* (2013.01); *G05B 19/4061* (2013.01); *G05B 2219/40428* (2013.01);
(Continued)

(58) Field of Classification Search
CPC ... B25J 9/1666; B25J 9/1664; G05B 19/4061; G05B 2219/40428; G05B 2219/40429; G05B 2219/40446; G05B 2219/40477
See application file for complete search history.

(56) References Cited

U.S. PATENT DOCUMENTS 8,568,302 B2    10/2013   Donhowe et al.
9,411,330 B2    8/2016    Iuchi et al.
(Continued)

FOREIGN PATENT DOCUMENTS

CN    101612733 B    7/2013
CN    103529856 A    1/2014
(Continued)

OTHER PUBLICATIONS

Oriolo, G., et al., "Probabilistic Motion Planning for Redundant Robots along Given End-Effector Paths," Oct. 2002, 2002 IEEE/RSJ Intl. Conference on Intelligent Robots and Systems, pp. 1657-1662 (Year: 2002).*

(Continued)

*Primary Examiner* — Abby Lin
*Assistant Examiner* — Karston G. Evans
(74) *Attorney, Agent, or Firm* — Murphy, Bilak & Homiller, PLLC

(57) ABSTRACT

Disclosed techniques for graph generation for online path planning offer multiple advantages, such as providing for high-quality motion during online operation of the robot, while reducing the computational burden of graph generation. Achieving these competing goals involves reducing the dimensionality of the graph generation problem by performing unconstrained sampling that defines partial robot poses that set values for fewer than all configuration parameters of the robot. The remaining configuration parameters for each sample are then determined in dependence on a distance function that relates the partial pose to one or more reference robot poses that are associated with one or more tasks to be performed by the robot and are provided as inputs to the graph generation. Reference robot poses may be determined automatically based on computer analysis of the robot application or may be user-input values.

23 Claims, 10 Drawing Sheets

(52) U.S. Cl.
CPC .............. *G05B 2219/40429* (2013.01); *G05B 2219/40446* (2013.01); *G05B 2219/40477* (2013.01)

(56) References Cited

U.S. PATENT DOCUMENTS

| | | | |
|---|---|---|---|
| 9,592,604 | B2 | 3/2017 | Hoffman et al. |
| 9,915,937 | B2 | 3/2018 | Linnell et al. |
| 10,296,995 | B2 | 5/2019 | Saboo et al. |
| 10,745,003 | B2 | 8/2020 | Kentley-Klay et al. |
| 10,782,670 | B2 | 9/2020 | Crivella et al. |
| 2017/0139423 | A1 | 5/2017 | El Ferik et al. |
| 2019/0232496 | A1 | 8/2019 | Graichen et al. |
| 2019/0314989 | A1* | 10/2019 | Sokabe ................ B25J 9/1664 |
| 2019/0366543 | A1* | 12/2019 | Butterfoss ............. B25J 9/162 |
| 2020/0305984 | A1 | 10/2020 | Zhao et al. |
| 2021/0060778 | A1 | 3/2021 | Butterfoss et al. |
| 2021/0308862 | A1 | 10/2021 | Lin et al. |
| 2024/0051136 | A1* | 2/2024 | Holhjem ............... B25J 9/1666 |

FOREIGN PATENT DOCUMENTS

| | | | |
|---|---|---|---|
| CN | 105824292 | A | 8/2016 |
| CN | 103970139 | B | 1/2017 |
| CN | 111496774 | A | 8/2020 |
| CN | 112706166 | A | 4/2021 |
| CN | 111300420 | B | 8/2021 |
| EP | 2485875 | B1 | 4/2013 |
| JP | 2012187697 | A | 10/2012 |
| JP | 2020040205 | A | 3/2020 |
| JP | 2021077276 | A | 5/2021 |
| JP | 2022073999 | A | 5/2022 |
| WO | 2020083633 | A1 | 4/2020 |

OTHER PUBLICATIONS

"RapidPlan Create 2.0—Roadmap Mode", Online User Guide—Confluence, Owned by Rebecca Jung (unlicensed), https://realtimerobotics.atlassian.net/WIKI/spaces/WIKI/pages/2415985358/RapidPlan+Create+2.0+-+Roadmap+Mode#Assign, Oct. 7, 2022, 14 pages.

Lavalle, Steven M, "Planning Algorithms", Published by Cambridge University Press, 2016, 1023.

Volz, Andreas , et al., "A Predictive Path-Following Controller for Continuous Replanning With Dynamic Roadmaps", IEEE Robotics and Automation Letters, vol. 4, No. 4, Oct. 2019, 8 pages.

Volz, Andreas , et al., "Composition of Dynamic Roadmaps for Dual-Arm Motion Planning", 2017 IEEE International Conference on Advanced Intelligent Mechatronics (AIM), Sheraton Arabella Park Hotel, Munich, Germany, Jul. 3-7, 2017, 7 pages.

Yang, Yiming , et al., "HDR: A Resolution Complete Dynamic Roadmap for Real-Time Motion Planning in Complex Scenes", IEEE Robotics and Automation Letters, vol. 3, No. 1, Jan. 1, 2018, pp. 551-558.

\* cited by examiner

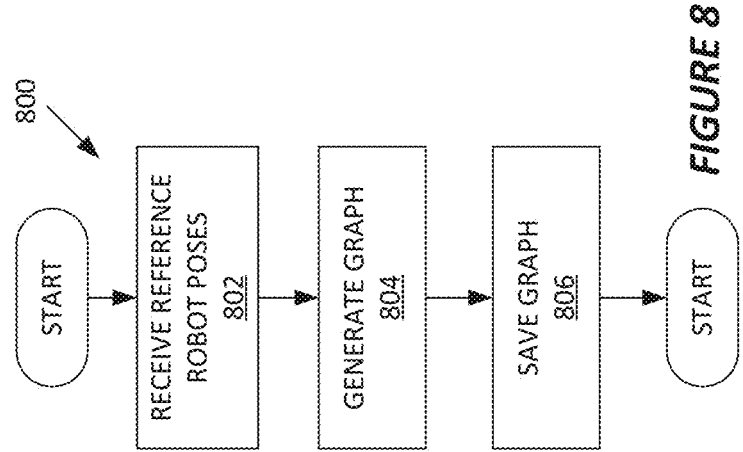
*FIGURE 8*
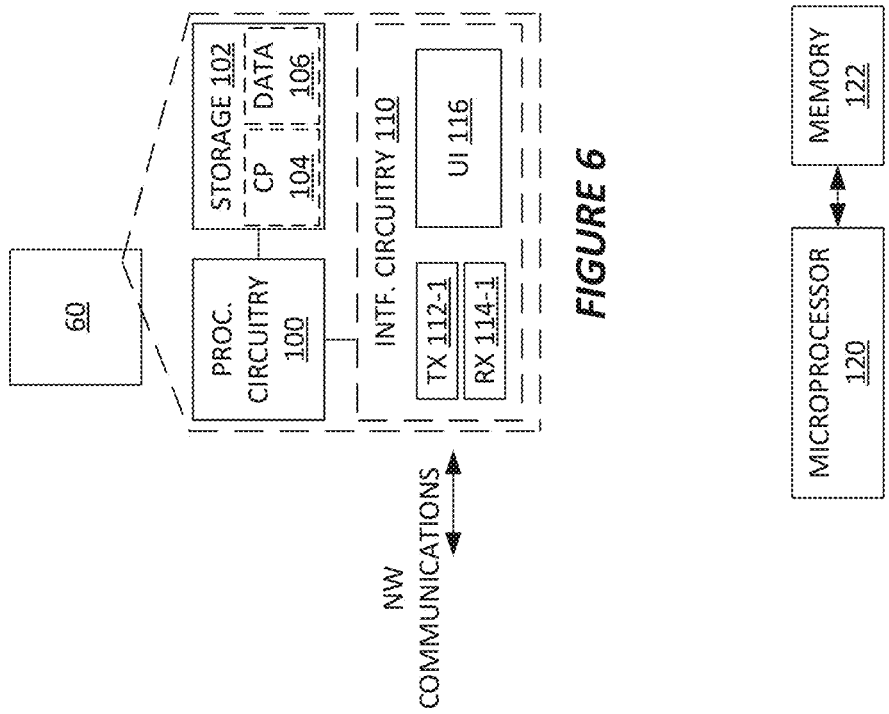
*FIGURE 6*
*FIGURE 7*

METHOD AND APPARATUS FOR IMPROVED SAMPLING-BASED GRAPH GENERATION FOR ONLINE PATH PLANNING BY A ROBOT

TECHNICAL FIELD

The present invention generally relates to robots, and particularly relates to the generation of graphs for use in online path planning.

BACKGROUND

The workspace of a robot is the region of space that the robot can reach and operate within, and it is determined by the physical dimensions of the robot, the number of joints or other articulations possessed by the robot, and the ranges of motion supported by its respective articulations. For example, for a three revolute joint robot in a two-dimensional plane, the workspace is a torus. For a three-revolute joint robot in three-dimensional space, the workspace is a subset of the Euclidean space ($\mathbb{R}^3$).

The term "pose" or "robot pose" refers to the combination of specific position and orientation of all links of a robot within its environment. Here, "link" refers in general to an articulated member or component that makes up the overall body of the robot. In scenarios where the robot carries a tool, each robot pose defines a specific position and orientation of the tool center point (TCP) within the workspace. Continuing with above example of a robot arm having three revolute joints, any particular combination of values for the three revolute joints defines a corresponding robot pose.

Of course, a given robot may have additional revolute joints or, in general, may have any number of joints, and may include a mix of joint types. Example joint types include revolute, prismatic, sliding, spherical, and cylindrical. Each independently controllable joint or other articulation of a robot represents a degree of freedom. Robots having high degrees of freedom (DoF) are capable of complex and highly flexible motion within their workspaces, making them suitable for a wide range of applications.

A typical "application" executed by a computer system controlling a robot requires moving the robot within its workspace, to perform one or more tasks. Moving the robot within its workspace requires the controller to determine a path for the motion, such as between a starting robot pose and an ending robot pose. "Online path planning" refers to the process of identifying feasible paths between respective robot poses, including static and dynamic obstacle avoidance in a typical operating scenario. A "path" in this context can be understood as a sequence of successive robot poses commanded for the robot, for transitioning the robot from one given position and orientation in the workspace to another. A "feasible" path is one that falls within the self-interference or other mechanical constraints of the robot and is collision free.

Online path planning for a robot with a high DoF imposes significant processing challenges. Namely, the dimensionality of the "configuration space" of a robot corresponds to the DoF of the robot. Here, the "configuration space" or "C-space" is a mathematical representation of all possible configurations of the robot, with the term "configuration" referring to a specific set of values for the complete set of parameters that must be set to fix the robot at a particular robot pose within its environment. Going back to the three-revolute-joint example, the C-space is the universe of all possible combinations of the three joint angles of the robot arm. Each possible combination may be represented as a corresponding "configuration vector" having three vector elements, with the value of each vector element specifying the joint angle for a respective one of the three joints. Of course, the configuration vector for a robot with high DoF will have many vector elements, each element corresponding to a respective one among the plurality of parameters that must be specified to fix a particular robot pose.

Online path planning for a robot with a high DoF imposes significant processing challenges because dimensionality of the C-space corresponds to the DoF of the robot, meaning that path planning requires searching for feasible paths in a potentially enormous search space. One way of simplifying path searching involves constraining the possible paths of the robot. One such approach involves providing the online path planner with a "graph," which in this context can be understood as a data structure defining a set or collection of nodes and corresponding edges. Each node represents a different configuration of the robot—a different robot pose—and each edge represents a feasible path between a respective pair of such nodes.

Rather than considering all possible paths from moving from one robot pose to another, the controller uses the graph to plan a path that follows along edges in the graph, thus reducing its path search space to those paths that are defined by the graph. However, for this graph-based approach to work in the sense of providing smooth, high-quality motion with sufficient planning flexibility for dynamic path planning, the graph must contain a sufficiently large and sufficiently distributed collection of nodes. That is, the graph must provide a sufficient number of paths to choose from with respect to the robot motion(s) required for executing the task(s) specified by the application.

Various approaches exist for graph generation, including a range of sampling-based approaches, where each "sample" is a point in the workspace of the robot. That is, each sample corresponds to a specific robot pose. Example variations within the family of sampling-based approaches include Rapidly-exploring Random Trees (RRTs) and Roadmap-based approaches. Even with respect to RRT and Roadmap-based implementations, many sub-variations exist.

Regardless of the particular approach used for graph generation, graphing solutions do not eliminate the problem of high dimensionality and corresponding computational burdens. With high DoF, the computational burden remains significant, and the required processing may be impractical or at best grossly inefficient. On the other hand, attempts at shortcutting or otherwise reducing the computational complexity of graph generation risk producing graphs that result in low-quality motion and inefficient path decisions during online path planning.

SUMMARY

Disclosed techniques for graph generation for online path planning offer multiple advantages, such as providing for high-quality motion during online operation of the robot, while reducing the computational burden of graph generation. Achieving these competing goals involves reducing the dimensionality of the graph generation problem by performing unconstrained sampling that defines partial robot poses that set values for fewer than all configuration parameters of the robot. The remaining configuration parameters for each sample are then determined in constrained fashion, in dependence on a distance function that relates the partial pose to one or more reference robot poses that are provided as inputs to the graph generation and are associated with one or more tasks to be performed by the robot. Reference robot poses may be determined automatically based on computer analysis of the robot application or may be user-input values.

One embodiment comprises a method of generating a graph for use by an online path planner in controlling motion of a robot within an environment. The method includes performing a sampling procedure that involves unconstrained selection of partial poses of the robot within the environment, such that the sampling procedure works at a dimensionality lower than the Degrees of Freedom (DoF) of the robot. Each partial pose specifies values for fewer than all configuration parameters needed to define a complete pose of the robot within the environment, and the method includes converting each partial pose into a corresponding complete pose by, for each partial pose, determining values for the configuration parameter(s) not accounted for in partial pose according to a distance function that relates the partial pose to one or more reference robot poses. Further, the method includes taking the complete poses as nodes of the graph and determining edges between respective pairs of the nodes, each edge being a feasible path between a particular pair of the nodes.

Another embodiment comprises a method of generating a graph for use in online path planning for a robot, with the graph being a data structure comprising a collection of nodes and edges, with each node representing a respective robot pose and each edge being a feasible path between a respective pair of the nodes. The method includes receiving data that specifies a set of two or more reference robot poses associated with task performance by the robot and generating each node as a corresponding configuration vector comprising a plurality of vector elements, with each vector element being a value for a corresponding one among a plurality of configuration parameters representing the degrees of freedom (DoF) of the robot.

The generation of each node includes: (i) setting a value for each of one or more vector elements in a first subset of the vector elements independent of the set of two or more reference robot poses, the first subset defining a partial robot pose; and (ii) setting a value for each of one or more vector elements in a disjoint second subset of the vector elements according to a distance function that relates the partial robot pose to one or more of the reference robot poses. The method further includes determining the edges according to path feasibility between respective pairs of the nodes and saving the graph to a computer-readable medium, for use by a computer controller of the robot in performing online path planning.

A related embodiment comprises a computer system for generating a graph for use in online path planning for a robot, where the graph comprises a collection of nodes and edges, with each node being a respective robot pose in a sampling frame of reference and each edge being a feasible path between a respective pair of the nodes. The computer system includes interface circuitry configured to receive data that identifies a set of two or more reference robot poses associated with task performance by the robot, and further includes processing circuitry.

The processing circuitry is configured to generate each node as a corresponding configuration vector comprising a plurality of vector elements, with each vector element being a value for a corresponding one among a plurality of configuration parameters representing the degrees of freedom (DoF) of the robot. According to its configuration, the processing circuitry performs the generation of each node by: (i) setting a value for each of one or more vector elements in a first subset of the vector elements independent of the set of two or more reference robot poses, the first subset defining a partial robot pose; (ii) setting a value for each of one or more vector elements in a disjoint second subset of the vector elements according to a distance function that relates the partial robot pose to one or more of the reference robot poses; and (iii) determining the edges according to path feasibility between respective pairs of the nodes. Further, the processing circuitry is configured to save the graph to a computer-readable medium, for use by a computer controller of the robot in performing online path planning.

Of course, the present invention is not limited to the above features and advantages. Those of ordinary skill in the art will recognize additional features and advantages upon reading the following detailed description, and upon viewing the accompanying drawings.

BRIEF DESCRIPTION OF THE DRAWINGS

FIGS. 6 and 7 are block diagrams of example details for the computer system introduced in FIG. 3.

FIGS. 8 and 9 are logic flow diagrams illustrating a method of graph generation using partial constraints, according to an example embodiment.

FIG. 10 is a logic flow diagram illustrating a method of graph generation using partial constraints, according to an example embodiment.

DETAILED DESCRIPTION

Figure 1:
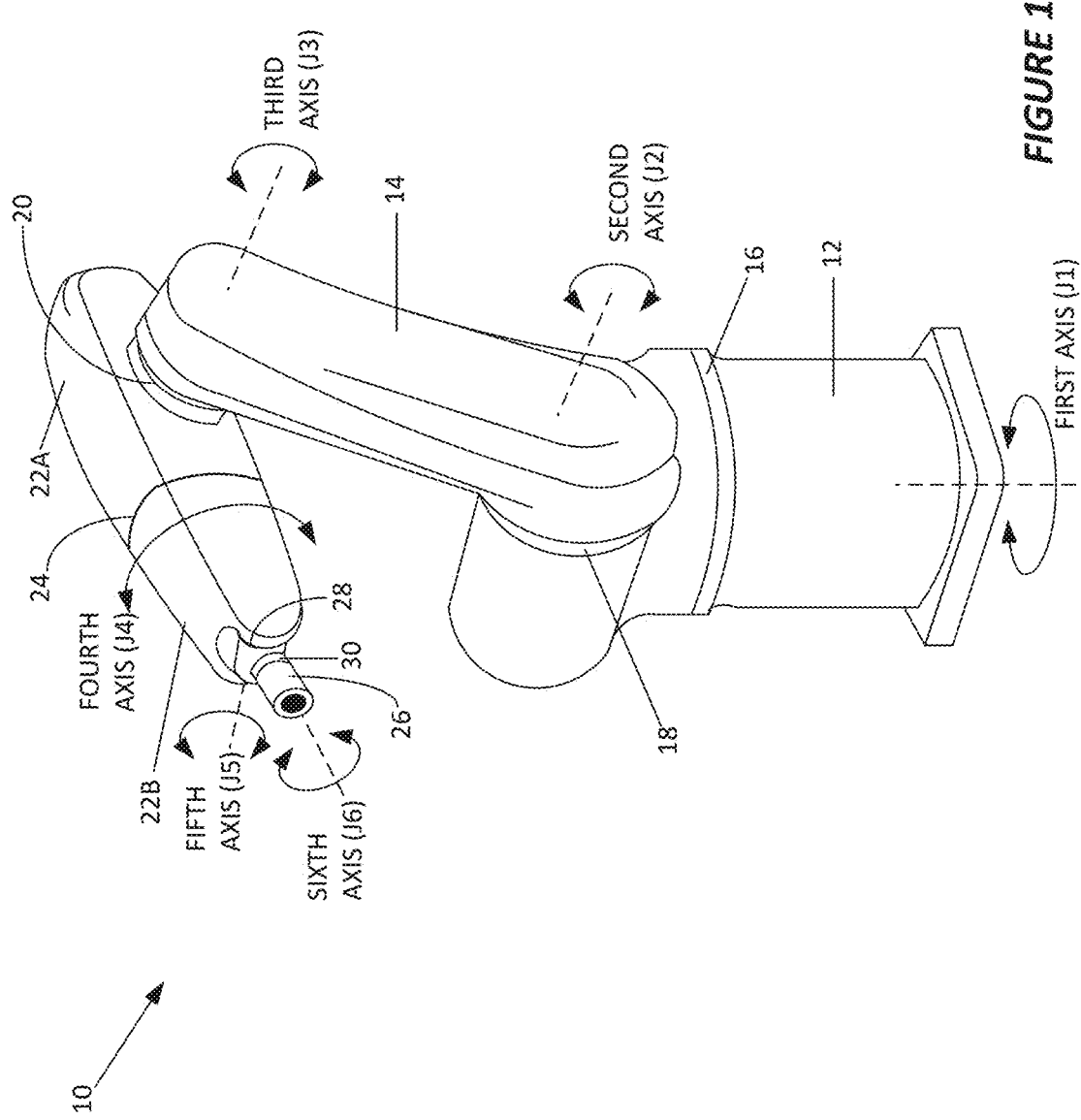
FIG. 1 is a diagram of an example robot.

FIG. 1 illustrates an example robot 10 having a base 12 that couples to a first arm 14 through a first revolute joint 16, providing a first axis of rotation denoted as J1. A second revolute joint 18 allows the first arm 14 to rotate relative to the base 12 about a second axis of rotation denoted as J2. A third revolute joint 20 connects the first arm 14 to a first segment 22A of a second arm, thus allowing the first segment 22A of the second arm to rotate relative to the first arm 14 about a third axis of rotation denoted as J3. A fourth revolute joint 24 allows a second segment 22B of the second arm to rotate relative to the first segment 22A about a fourth axis of rotation denoted as J4. Together, the two segments 22A and 22B may be referred to together as the second arm 22.

The second arm 22 terminates in an articulated end effector or tool holder 26 that adds fifth and sixth axes of rotation, denoted as the J5 and J6 axes, respectively. A fifth revolute joint 28 provides the J5 axis. A sixth revolute joint 30 allows the terminal portion of the end effector or tool holder 26 to rotate around the J6 axis. For generality, the end effector or tool holder 26 may simply be referred to as the end element 26. The elements 22B and 26, with their J4, J5, and J6 articulations, form a wrist portion of the robot, which allows the robot 10 to perform rotational movements and precise positioning of the end element 26 and any tool held therein, while the J1, J2, and J3 articulations provide for gross positioning of the robot 10 within its workspace.

Any desired TCP position and orientation of the robot 10 corresponds to a point in space that has a defined relationship to the wrist center of the robot 10 and, within the mechanical constraints of the robot 10, corresponds to a specific configuration of the robot 10 within its configuration space (C-space). Broadly, the C-space contains all possible values of joint angles for the six joints, although the C-space may be filtered or otherwise limited only to those combinations that are within the mechanical limits of the robot 10.

For an example scenario where the robot 10 has six revolute joints, J1-J6, a corresponding configuration vector may be expressed as C={VJ1, VJ2, VJ3, VJ4, VJ5, VJ6}, where "VJX" denotes the angle of any given joint X. Thus, each unique combination of values for the six joint angles represents a specific configuration of the robot 10 and, correspondingly, represents a specific robot pose. That is, specifying a value for each of the joint angles defines the complete spatial position and orientation of the robot 10 within its surrounding environment or workspace, which may be understood as defining a specific robot pose, also referred to as a "complete robot pose" to emphasize that values for all joints—broadly, articulations—of the robot 10 are specified.

Different configuration vectors—i.e., different combinations of values for the collective set of joint angles—define different robot poses. Each robot pose thus defines a specific orientation and position of the tool center point (TCP) for a tool held by the robot 10.

With each configuration vector representing a specific, corresponding position and orientation of the TCP within the workspace, programming the robot to perform a particular task can be understood as determining a sequence of robot poses that moves the end element 26 or tool held thereby through the workspace of the robot 10 at the required positions and with the required orientations. As noted in the background section herein, the determining the sequence of robot poses needed to carry out a task may be referred to as path planning and even with the six degrees of freedom (DoF) possessed by the example robot 10, path planning represents a mathematically complex processing problem.

Figure 2:
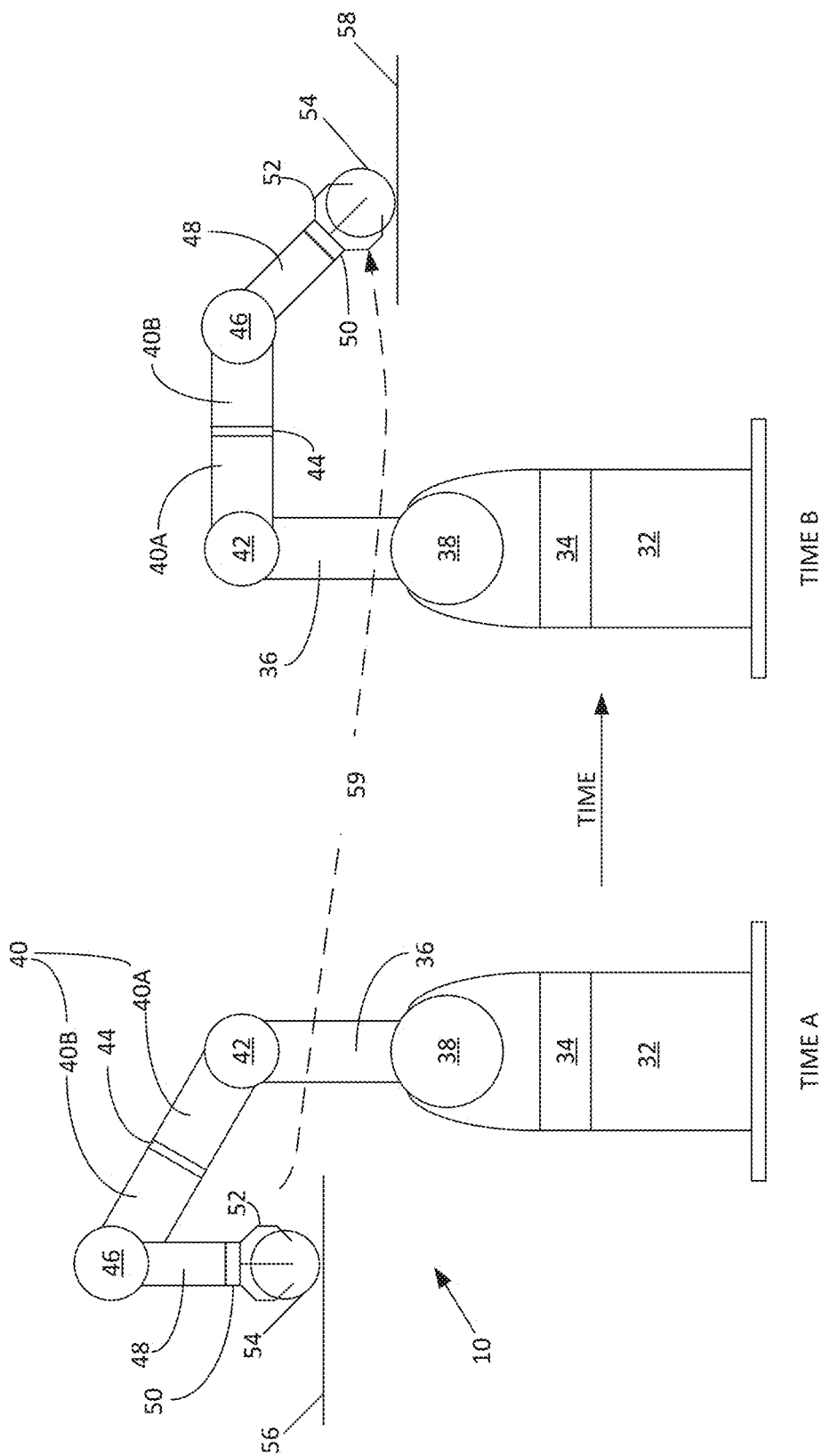
FIG. 2 is a diagram of another example robot and illustrates a change in the pose of the robot from Time A to Time B.

FIG. 2 illustrates the robot 10 according to another embodiment. That is, as used herein, the term "robot 10" is used as a general reference and not as a reference to a specific mechanical arrangement.

The robot 10 shown in FIG. 2 includes base 32 having a first revolute joint 34, a first arm 36 fixed to the rotating portion of the base 32 at one end by a second revolute joint 38 and fixed to a second arm 40 at its other end by a third revolute joint 42. The second arm 40 comprises a first segment 40A that is joined to a second segment 40B via a fourth revolute joint 44, and a fifth revolute joint 46 couples the second segment 40B to a third arm 48. A sixth revolute joint 50 couples the terminal end of the third arm 48 to a gripper 52, as a type of end element 26. The robot 10 performs an application in which it picks up an object 54 from a first surface 56, such as a parts shelf, and places the object 54 on a second surface 58, such as a working surface. Carrying out the application, which may be regarded as a collection of tasks or sub-tasks requires the robot 10 to follow a path 59 through its environment. Again, the movement of the robot 10 along the path 59 may be understood as the robot 10 moving through a succession of robot poses.

The problem of planning the path 59 involves a plethora of considerations, including mechanical feasibility, e.g., relating to self-interference limits and joint constraints of the robot 10, along with consideration of static obstacles, dynamic obstacles, and motion quality. Here, "motion quality" refers to smoothness and efficiency. For example, if given robot poses within the sequence of robot poses comprised in the path 59 include rapid pose changes or non-monotonic changes in one or more of the joint angles, the robot 10 may experience jerkiness, vibration, etc.

Figure 3:
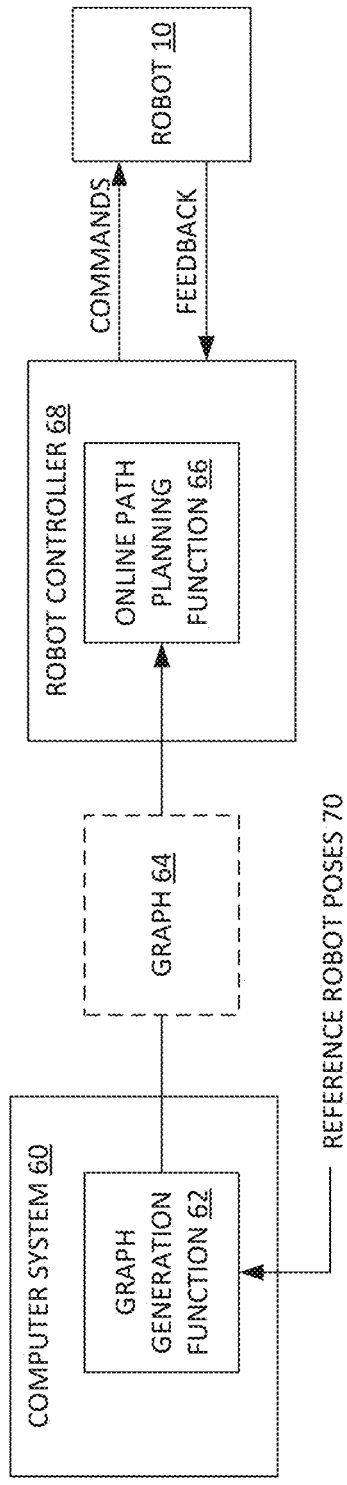
FIG. 3 is a block diagram of a computer system configured to generate a graph for use in online path planning, according to an example embodiment.

With higher DoF, the path planning problem becomes even more challenging. However, as noted in the background section, online path planning may be simplified through the use of a graph. FIG. 3 illustrates a computer system 60, which is programmed to instantiate and run a graph generation function 62 that implements an advantageous technique for generating a graph 64 for use by an online path planning function 66 that is instantiated by a robot controller 68. Here, the robot controller 68 may itself be a general purpose computer or programmable logic controller (PLC) that is specially adapted via program execution to instantiate the online path planning function 66 and carry out overall control of the robot 10. Thus, in one or more embodiments, the robot controller 68 also serves as the computer system 60 or, phrased differently, the robot controller 68 in one or more embodiments is programmed to implement the graph generation function 62. However, other embodiments involve a computer separate from the robot controller 68, for graph generation.

The advantageous technique for graph generation relies on one or more reference robot poses 70, which serve as additional inputs to the graph generation function 62. Each reference robot pose 70 is a configuration vector for the robot 10, i.e., a complete set of values for all parameters needed to specify a particular pose of the robot 10 within its environment. The reference robot poses may be input as coordinates in space—points within the workspace of the robot—and translated into the corresponding configuration vectors or may be input directly as configuration vectors in the C-space. In one or more embodiments, a human operator, a user, inputs the reference robot poses 70. In one or more other embodiments, the reference robot poses 70 are derived from automatic processing of the involved robot application.

With the six-DoF example of FIG. 1 being non-limiting and with much higher DoF contemplated, a given robot 10 as discussed hereafter has M DoF, where M is an integer that is greater than or equal to two, but is much larger than two typically, such as seven, ten, fourteen, etc. Having M DoF means that there are M configuration parameters whose values must be specified to set a particular robot pose. Each configuration parameter corresponds to an articulation of the robot 10, e.g., a sliding linkage, a revolute joint, a prismatic joint, etc.

Using the above nomenclature, each reference robot pose 70 is defined by a configuration vector having M vector elements, with each vector element specifying the value of a corresponding one among the M configuration parameters of the robot 10. Consider an example where M equals seven (7), with each one of the M configuration parameters being a joint angle or whatever type of value is appropriate for the corresponding articulation. Although respective configuration parameters may be specified independently, at least within a possible range of values, a hierarchy or mechanical ordering applies to them.

For example, referring to FIG. 1, the angle set for the first revolute joint 16 dictates the region of space in which the first arm 14 moves. Together, the angles set for the first and second revolute joints 16 and 18 dictate the region of space in which the second arm 22 moves, and so on. Thus, saying that the joints more broadly, the articulations of a robot have a hierarchical, physical, or mechanical ordering refers to the fact that each successively movable element of the robot, going from its first or base element out to its ending element, influences the region(s) of space reachable by the succeeding elements.

The reference robot poses 70 are provided, for example, as a set of two or more reference robot poses and they are associated with one or more tasks to be performed by the robot 10. For example, one or more of the reference robot poses 70 may be an actual robot pose used in performance of a task. As a particular example, one reference robot pose 70 is a pose corresponding to the start of a task to be performed by the robot and another reference robot pose 70 is a pose corresponding to the task end. Additional or alternative reference robot poses 70 may be provided, however.

Broadly, the reference robot poses 70 being "associated" with one or more tasks means that the reference robot poses 70 are feasible poses that are at least similar to one or more robot poses used in task performance. The reference robot poses 70 may be specified in two ways: (a) a discrete set of two or more points, or (b) a discrete number of continuous waypoints. Here, the term "point" references a particular point in space within the workspace frame of reference, or the corresponding configuration vector within the C-space.

Figure 4:
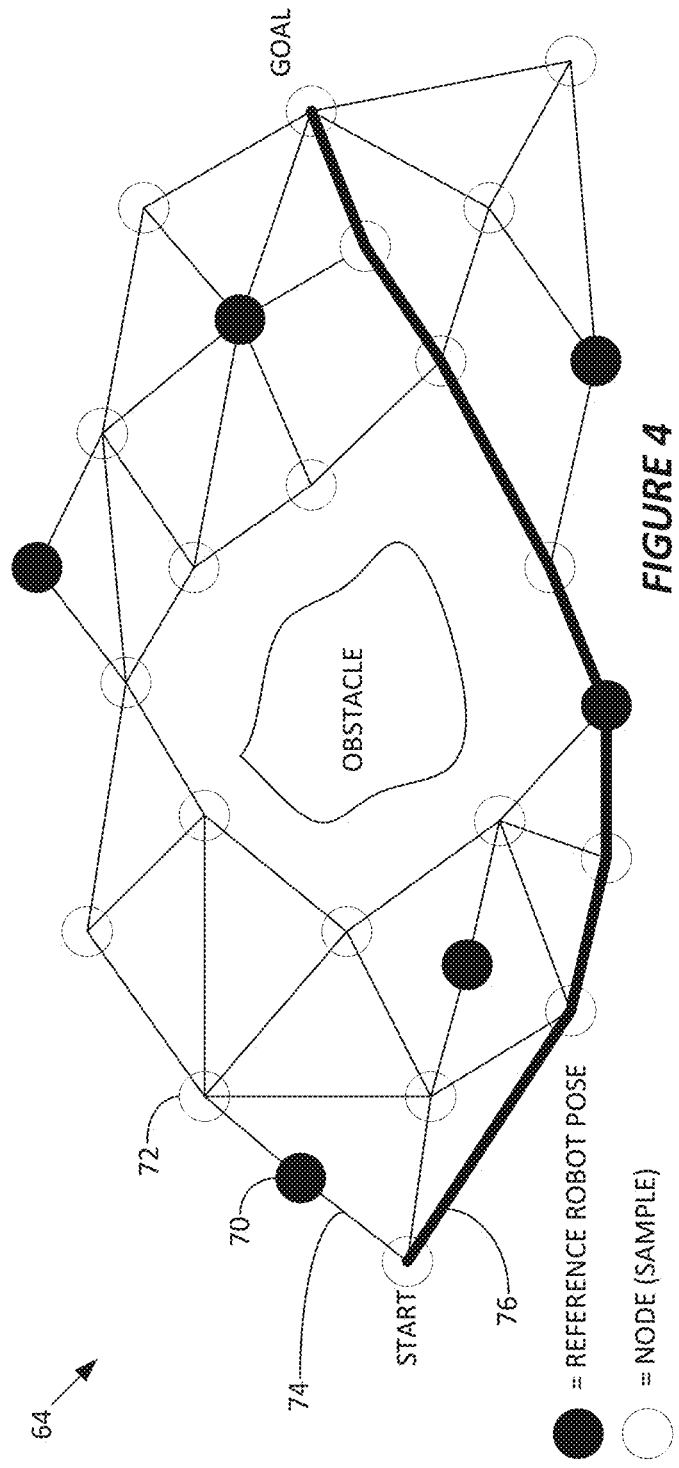
FIG. 4 is a diagram of an example graph for use in online path planning.

FIG. 4 illustrates an example graph 64 generated by the computer system 60, where the graph 64 comprises a collection of nodes 72 interconnected by edges 74. Each node 72 represents a respective reference robot pose and each edge 74 is a feasible path between a respective pair of the nodes 72. FIG. 4 also shows a path 76 formed by the online path planning function 66, using the nodes 72/edges 74 of the graph 64. However, the path 76 is not part of the initial graph generation performed by the graph generation function 62.

Figure 5:
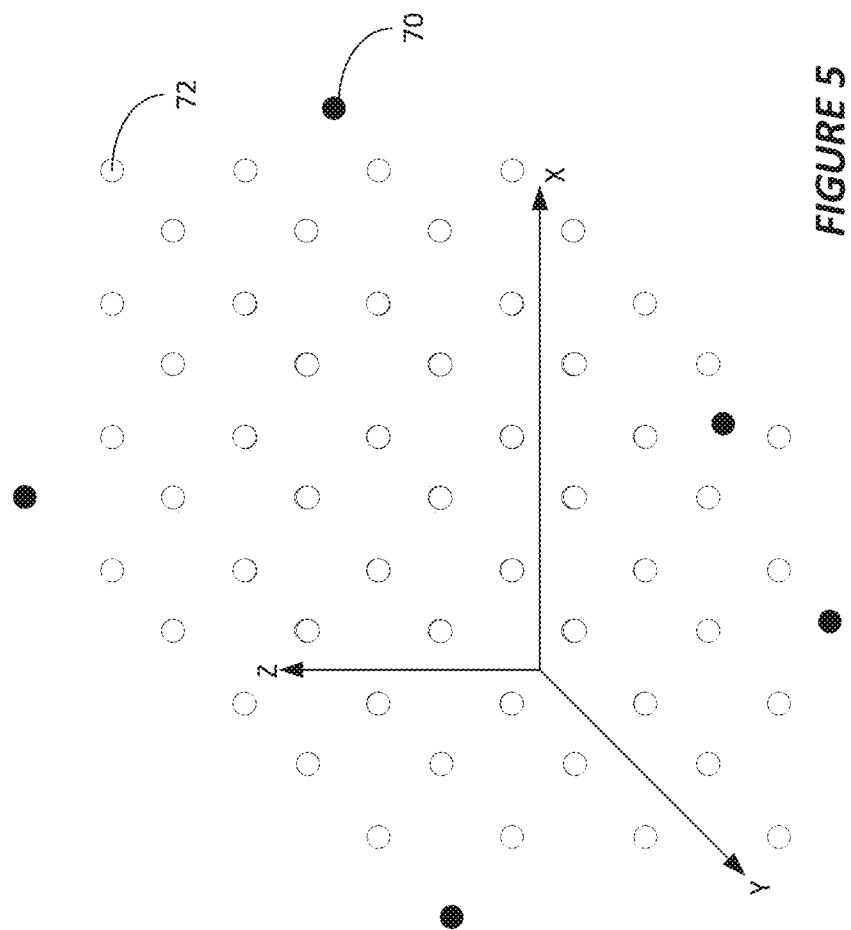
FIG. 5 is a diagram of an example set of samples (nodes) and reference robot poses, as used in a partially constrained approach to graph generation, according to an example embodiment.

FIG. 5 illustrates another example collection of nodes 72, such as may be generated by the graph generation function 62. Here, the nodes 72 are shown in a perspective view, so that they can be better understood as being or representing points within the workspace of the robot 10. Each point is a particular robot pose that produces a specific wrist center position and orientation within the workspace.

The points may be generated via a "sampling" process, where the graph generation function 62 generates each point (node 72) in the graph 64 as a selected (sampled) point in the sampling frame of reference, which may be the workspace or the C-space. Advantageously, the sampling technique disclosed herein generates the graph nodes 72 using a "partially constrained" approach, where "unconstrained sampling" sets values for only a first subset of the configuration parameters of the robot, with the values set for the remaining second subset of the configuration parameters determined on a "constrained" basis. This approach allows initial sampling to operate at a dimensionality lower than the full DoF of the robot, but with the constraints ensuring that the resulting graph 64 provides for high-quality motion.

"Unconstrained sampling" means that sampling is performed in the sampling frame of reference—the robot workspace or configuration space—without utilizing any reference robot poses 70. Correspondingly, determination of values for the configuration parameters not set during unconstrained sampling in dependence on the reference robot poses 70 represents a constraint, such that the determination of values for all configuration parameters at each sample—i.e., at each point or node in the graph 64—is regarded as "partially constrained." One way to view the technique is that the unconstrained sampling corresponds to defining "partial robot poses," meaning that values for one or more but not all configuration parameters of the robot are set in unconstrained fashion, with each partial pose then "converted" into a complete or full robot pose, in dependence on one or more of the reference robot poses 70.

FIG. 6 illustrates an embodiment of the computer system 60 configured for graph generation—i.e., implementation of the graph generation function 62. This same circuitry may further be configured to perform online path planning and overall robot control, such as where a general-purpose microprocessor executes computer program instructions that cause it to instantiate the graph generation function 62 and the online path planning function 66.

According to the illustrated details, the computer system 60 includes processing circuitry 100, which may include or be communicatively coupled with storage 102. In one or more embodiments, the storage 102 stores one or more computer programs 104 ("CP" in the diagram), along with one or more types of data 106. In at least one embodiment, the stored data 106 includes one or more generated graphs 64.

Interface circuitry 110 of the computer system 60 provides communicative coupling of the processing circuitry 100 with one or more external entities, systems, or devices. For example, the interface circuitry 110 includes first transceiver circuitry—shown as a transmitter (TX) 112 and a receiver (RX) 114—for interfacing with a Local Area Network (LAN) or other data network. A non-limiting example is implementation of the TX 112 and RX 114 as Ethernet-based interface circuitry. Of course, such circuitry may be radio circuitry for wireless communications, as an alternative or an addition to wired connectivity.

The illustrated interface circuitry 110 further includes a user interface (UI) 116, such as interface circuitry supporting one or more electronic displays, mice, keyboards, etc. In at least one embodiment, the user interacts with the computer system 60 for inputting reference robot poses 70, such as by inputting them according to a user interface elements displayed on an electronic display, or by directing the computer system 60 to read them from a data file.

FIG. 7 illustrates the processing circuitry 100 according to an example embodiment, where one or more general-purpose microprocessors 120 are specially adapted to carry out the graph generation described herein, based on executing computer program instructions stored in the memory 122. In this respect, the storage 102 may comprise or otherwise include the memory 122 and, more broadly, may be understood as one or more types of computer-readable media. Examples include volatile and non-volatile memory and/or file storage systems.

Thus, in one or more embodiments a computer system 60 is generating a graph 64 for use in online path planning for a robot 10. The graph 64 comprises a collection of nodes 72 and edges 74, with each node 72 being a respective robot pose in a sampling frame of reference and each edge 74 being a feasible path between a respective pair of the nodes 72. The computer system 60 includes interface circuitry 110 configured to receive data that identifies a set of two or more reference robot poses 70 associated with task performance by the robot 10.

Further, the processing circuitry 100 is configured to generate each node 72 as a corresponding configuration vector comprising a plurality of vector elements, with each vector element being a value for a corresponding one among a plurality of configuration parameters representing the degrees of freedom (DoF) of the robot 10. The per-node generation is based on: (a) setting a value for each of one or more vector elements in a first subset of the vector elements independent of the set of two or more reference robot poses 70, the first subset defining a partial robot pose; and (b) setting a value for each of one or more vector elements in a disjoint second subset of the vector elements according to a distance function that relates the partial robot pose to one or more of the reference robot poses 70.

The processing circuitry 100 is further configured to determine the edges 74 according to path feasibility between respective pairs of the nodes 72 and save the graph 64 to a computer-readable medium, for use by a computer controller 68 of the robot 10 in performing online path planning. The computer-readable medium may be a memory 122 used by an online path planner—e.g., the online path planning function 66—or a file storage system that is accessed by the online path planner.

The robot 10 has M articulation points going in physical order from a first articulation point to a last articulation point, such that each corresponding configuration vector has M vector elements, going from a first vector element to a last vector element, wherein the first subset of vector elements contains the first N of M vector elements, with the second subset correspondingly containing the last (M-N) vector elements, and wherein M and N are integers, with M≥2 and 1≤N<M. Broadly, the first subset of vector elements defines the configuration of the first N of M joints of the robot 10, and the second subset defines the configuration of the remaining (M-N) joints of the robot 10.

Consider configuration vectors in the form of {VA1, VA2, VA3, VA4, . . . , VAM}, where "V" denotes value, "A1" is the first joint or other articulation, A2 is the second articulation, and so on. Here, "first, "second," and so on refers to the hierarchy of the articulations, e.g., the physical sequence of articulations going from the base of the robot 10 to the end of the robot 10. Going back to FIG. 1 for a moment, the joint J2 is lower in the joint hierarchy than the joint J1 because the region of space in which joint J2 moves the associated arm is dictated by the value at which joint J1 is set.

As such, the term "partial pose" refers to an incomplete specification of values for the M configuration parameters of the robot 10. In a specific example, the term "partial pose" means that at least the first configuration parameter of the robot 10 has been set, but that one or more further ones of the configuration parameters have not been set. Thus, a partial pose is an incomplete specification of configuration parameters for the robot 10.

Consider a six-articulation robot having C in the form of {VA1, VA2, VA3, VA4, VA5, VA6}, going in physical ordering of the articulations in the robot 10. Any of the following "first subsets" defines a partial robot pose in this example context: {VA1, VA2, VA3, VA4, VA5}, {VA1, VA2. VA3, VA4}, {VA1, VA2, VA3}, {VA1, VA2}, and {VA1}. If the first subset is {VA1, VA2, VA3}, then the remaining second subset is {VA4, VA5, and VA6}.

Rather than sampling points of the graph 64 in in an M-dimensional search space, sampling occurs in a reduced search space having a dimensionality corresponding to the number of configuration elements included in the first subset. The number of vector elements to include in the first subset may depend upon the particular robot and upon the particular application. In any case, by considering fewer than all dimensions M in the initial node generation, the processing circuitry 100 is configured to select the partial robot poses as points in a reduced-dimensionality space corresponding to a dimensionality of the first subsets.

The points—partial poses—may be determined according to deterministic sampling or random sampling. The points are selected, for example, via execution of a Probabilistic Roadmap (PRM) algorithm. In another example, the points are selected via execution of a Rapidly-exploring Random Tree (RRT) algorithm.

Regardless of the particular sampling algorithm used, the graph 64 is generated by selecting points in an N-dimensional space, where M is the DoF of the robot 10 and N<M. "Selecting" a point in N-dimensional space means setting values for each of the first N configuration parameters among the M total configuration parameters of the robot 10, where N is greater than or equal to one. The value(s) may be deterministically or randomly chosen, and they may be filtered or generated in view of feasible values, but they are set independent of the reference robot poses 70.

To convert each such point—each such partial robot pose—to a full or complete robot pose, the value(s) of configuration parameter(s) excluded from the partial pose are set according to a distance function that relates the partial pose to the reference robot poses 70, which are provided as a set of two or more reference robot poses 70. Setting the value(s) of the remaining configuration parameter(s) at point according to the distance function bounds the change in TCP orientation between nodes 72 of the graph 64, which ensures high-quality motion. In other words, the approach allows for sampling at a relatively coarse level at a dimensionality lower than the DoF of the robot 10, while providing graph edges 74 embodying high-quality motion.

The set of two or more reference robot poses 70 is a continuous set in one or more embodiments, and the distance function is expressed as a non-linear optimization problem. In one or more other embodiments, the set of two or more reference robot poses 70 is a discrete set of reference robot poses and the distance function is an analytic function.

Figures 9, 10:
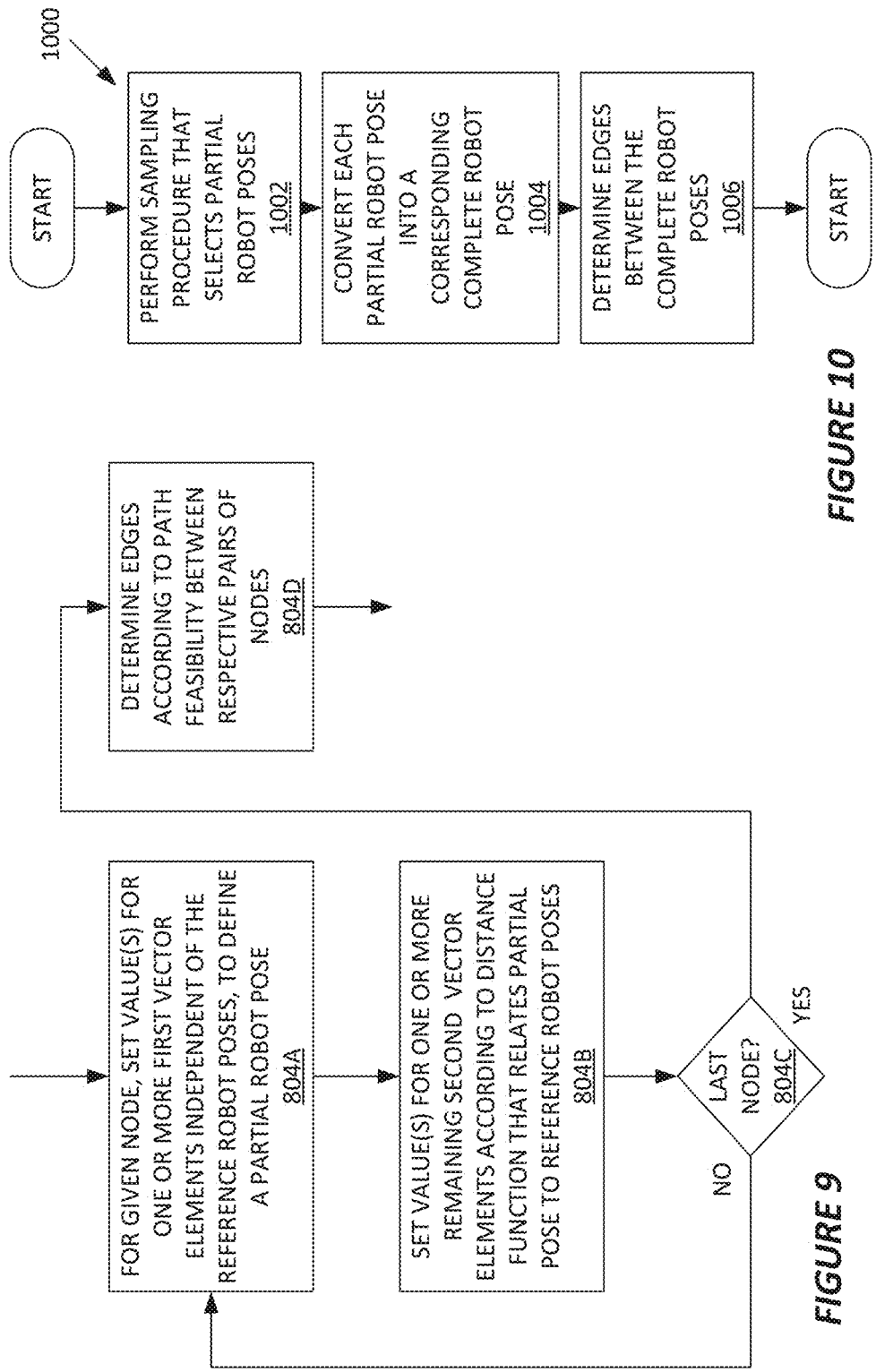

FIGS. 8 and 9 illustrate a method 800 of generating a graph 64 for use in online path planning for a robot 10. The graph 64 is a data structure comprising a collection of nodes 72 and edges 74, with each node 72 representing a respective robot pose and each edge 74 being a feasible path between a respective pair of the nodes 72. The method 800 includes receiving (Block 802) data that specifies a set of two or more reference robot poses 70 associated with task performance by the robot 10 and generating (Block 804) each node 72 as a corresponding configuration vector comprising a plurality of vector elements, with each vector element being a value for a corresponding one among a plurality of configuration parameters representing the degrees of freedom (DoF) of the robot 10.

For each node, the generating includes setting (Block 804A) a value for each of one or more vector elements in a first subset of the vector elements independent of the set of two or more reference robot poses, the first subset defining a partial robot pose, and setting (Block 804B) a value for each of one or more vector elements in a disjoint second subset of the vector elements according to a distance function that relates the partial robot pose to one or more of the reference robot poses 70. Once node generation completes (YES from Block 804C), the method 800 continues with determining (Block 804D) the edges 74 according to path feasibility between respective pairs of the nodes 72 and saving (Block 806) the graph 64 to a computer-readable medium, for use by a computer controller 68 of the robot 10 in performing online path planning.

The method 800 may further include steps corresponding to any one or any combination of operations described above for the processing circuitry 100.

FIG. 10 illustrates a method 1000 of generating a graph 64 for use by an online path planner in controlling motion of a robot 10. The method 800 may be understood as being a more detailed example of the method 1000.

The method 1000 includes performing (Block 1002) a sampling procedure that selects partial poses of the robot 10 within the environment, such that the sampling procedure works at a dimensionality lower than the robot DoF. Each partial robot pose specifies values for fewer than all configuration parameters needed to define a complete pose of the robot 10 within the environment. The method 1000 further includes converting (Block 1004) each partial robot pose into a corresponding complete robot pose by, for each partial pose, determining values for configuration parameters not accounted for in the partial pose according to a distance function that relates the partial robot pose to a set of two or more reference robot poses 70. Still further, the method 1000 includes taking the complete robot poses as nodes 72 of the graph 64 and determining (Block 1006) edges 74 between respective pairs of the nodes 72, each edge 74 being a feasible path between a particular pair of the nodes 72.

The foregoing details can be understood as examples of generating a graph 64, such as a "roadmap," that is used to compute feasible collision-free paths that a robot 10 can follow to a task or application while avoiding collisions with other objects and robots in the environment. The involved technique(s) reduce the size of the collision-free graph based on taking as inputs to graph generation a specified set of reference robot poses 70, which may be understood as robot tool center point poses. The reductions may be dramatic, such as an order of magnitude e.g., from a roadmap with potentially hundreds of thousands of nodes to a roadmap with tens of thousands of nodes.

A "roadmap" is this context is a particular form of graph generation, and it comprises a set of valid configurations of the robot—nodes—with edges interconnecting the nodes. During online motion planning, the robot uses the roadmap to find a path from its current configuration to a desired configuration. The robot can query the roadmap to find a path that avoids obstacles or other constraints.

The graph also may be generated a Rapidly-exploring Random Tree (RRT) algorithm, which is another type of sampling-based algorithm. The RRT algorithm is a randomized process that incrementally builds a tree structure in the configuration space of a robot, based on iteratively adding new nodes to the tree. Each new node is selected by sampling the configuration space randomly, and then connecting it to the nearest node in the tree. The process repeats until a path from the starting configuration to the goal configuration is found. In the context of the dimensionality reductions discussed above, respective nodes may be generated as partial robot poses that are then refined into complete robot poses, based on a distance relation to the input set of reference robot poses.

The reduced-size graphs enable fast online path planning for robots. For example, a user can specify a reference robot tool center point pose for a robot used for a pick-and-place application, based on the constraints in the environment. The robot control then generates a collision-free roadmap with tool center point configurations as close as possible to the input reference pose while maintaining the small size of the roadmap. For example, with an Intel® Core™ i7 CPU running at 2.21 GHz, the techniques described in this specification allow the computation of a smooth, feasible, collision-free path from the roadmap with five to ten thousand nodes, in real-time, typically 20-25 milliseconds, for a six DoF robot.

Figure 11:
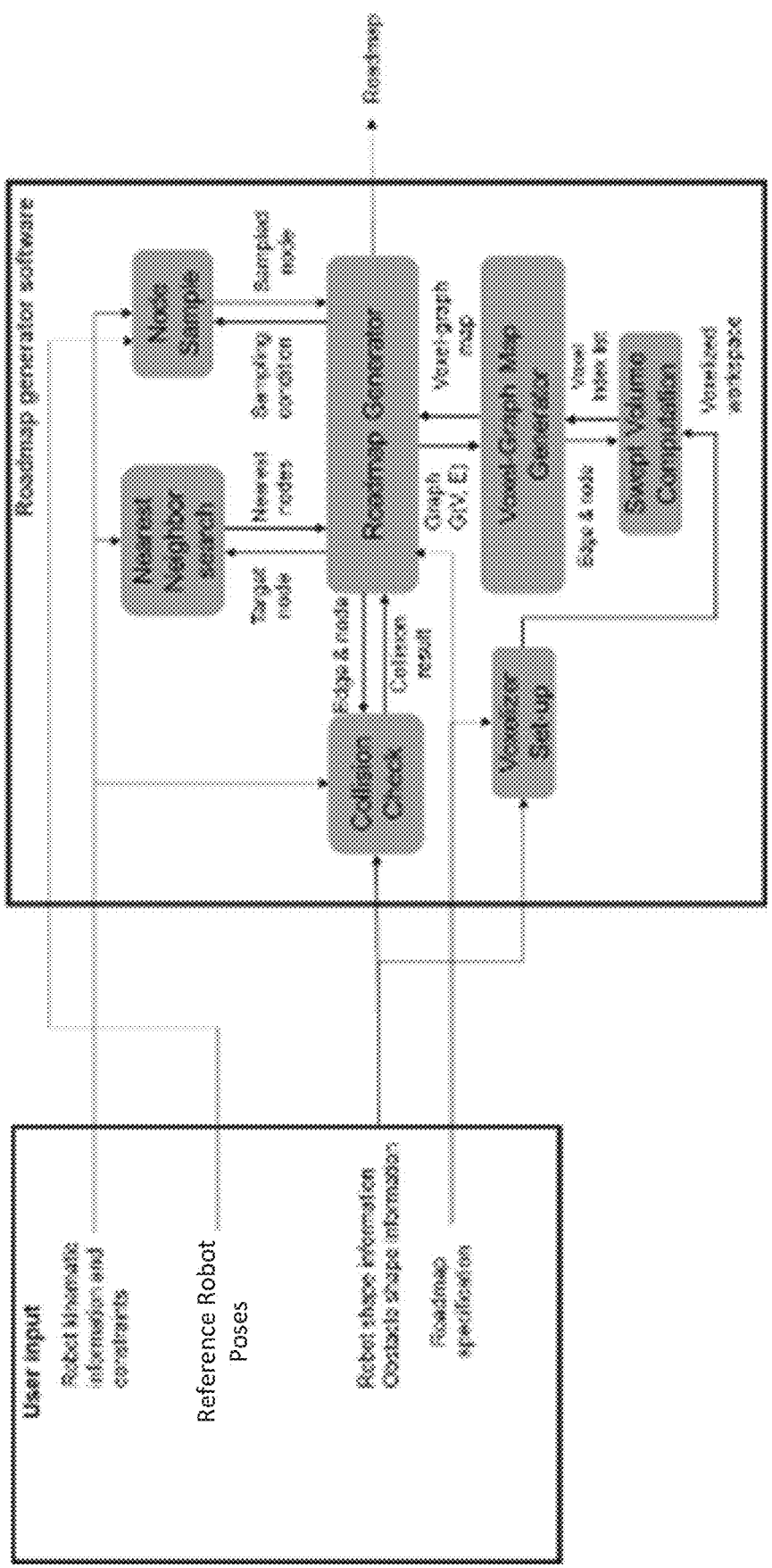
FIG. 11 is a block diagram of functional modules or processing units for generating a graph using partial constraints, according to an example embodiment.

FIG. 11 illustrates an example implementation of functional processing modules or units, for generating a roadmap according to the disclosed techniques. "User input" includes kinematic information and constraints for the involved robot, the set of two or more reference robot poses, robot shape information, obstacle shape information, and roadmap specifications, e.g., roadmap size, etc. Note that a "voxel" in the context of FIG. 11 is a cubic representation of occupancy parameterized by size and center (x, y, z) location. Of particular interest, the "Node Sample" operation operates at the reduced dimensionality associated with the partial robot poses discussed above.

For a six-axis robot, the C-space dimensionality may be represented as $\mathbb{R}^6$. Performing graph generation based on sampling in $\mathbb{R}^6$ is burdensome but known approaches to sampling with reduced dimensionality involve motion-quality compromises, such as by simply freezing the values taken on by a subset of the configuration parameters. For example, in the case of Cartesian space sampling, the typical choice of the sampling space is the robot TCP position $p \in \mathbb{R}^3$ and TCP orientation (e.g., Euler angles) $\varphi \in \mathbb{R}^3$.

In this case, a possible solution to reduce the sampling dimensionality is to introduce constraints, such as a constraint on the TCP orientation. In this case, the node sampling is restricted to a lower dimension as the sampling space is three-dimensional $p \in \mathbb{R}^3$ instead of $\mathbb{R}^6$. Dividing each dimension by 10 leads to $n_\varphi \times 10^3$ nodes, where $n_\varphi$ is the number of given TCP orientations. The number of nodes, in this case, is much smaller than the configuration space case, thereby, the deterministic-Cartesian space sampling approach is computationally efficient. In the next sub-section, the idea proposed for roadmap generation with TCP orientation constraints is detailed. However, freezing the Euler angles as a "full constraint" used to reduce the sampling dimension introduces the likelihood of low-quality motion between the resulting graph nodes.

Applying the disclosed technique to the instant six-axis example, the Euler angles are not frozen along the graph edges. Instead, the Euler angles at each graph node are computed according to a distance function that relates the partial pose, i.e., as defined by the sampled values for the TCP position parameters defined by $p \in \mathbb{R}^3$, to a set of two or more reference robot poses. Doing so bounds the change in TCP orientation along graph edges interconnecting respective graph nodes.

As a first step, a user may specify the workspace region (upper and lower bounds of x, y, and z range). In the second step, the user gives a reference (representative) configuration. The reference or representative configuration provides a basis for choosing an inverse kinematics solution and is needed in cases where sampling for graph generation occurs in the workspace and the sampled nodes need to be mapped back to C-space. In a third step, the user determines constraints on the roadmap. For example, the user can choose preferable TCP orientations (Euler angles of TCP point) during the motion. In a fourth step, the user provides a set of two or more reference robot poses, which may be robot configurations in proximity to the start and goal operations regions. The reference robot poses enable nodes on the roadmap to be connected to configurations near the start and goal region leading to shorter and smoother paths. In a fifth step, which is performed by the computer, the nodes are sampled equally in the workspace. Each sample point has multiple candidates for all given TCP orientations.

Next in the sixth step, workspace points are mapped into joint position $q \in \mathbb{R}^6$ by an inverse kinematics (IK) solver. The analytical IK solver outputs multiple solutions with some configuration combinations consisting of lefty, righty, above, below, flip, and non-flip. The graph generator chooses a solution, which is the closest to the reference configuration provided in step 2 and added to the graph as a node. Finally, in the seventh step, each node finds k nearest nodes by using a nearest neighbor search sub-module, then checks collision states of potential edges between the node and k nearest nodes. The collision-free edges are then added to the graph.

Thus, sampling complexity is reduced significantly by generating each node according to sampling $p \in \mathbb{R}^3$ while specifying a fixed TCP orientation (e.g., Euler angles) $\varphi \in \mathbb{R}^3$, then computing a configuration $q \in \mathbb{R}^6$ by using the IK solver for the TCP pose. In this case, p is used to determine $\theta_1 \sim \theta_3$, and the TCP orientation is used to constrain $\theta_4 \sim \theta_6$, not freeze them. If one specifies only fixed TCP orientations, the IK solver would compute the Euler angles ($\theta_4 \sim \theta_6$) to keep the TCP orientation in all cases. Doing so leads to an unnatural geometric path, making the robot motion non-smooth. The number of TCP orientation can be more than one; however, adding more variety of constraints does not always mitigate the non-smooth motion.

There can be other approaches to determine $\theta_4 \sim \theta_6$ without specifying TCP orientation. An approach is to choose $\theta_4 \sim \theta_6$ directly in the configuration space. The simplest way is to provide a fixed combination of $\theta_4 \sim \theta_6$. In this case, the TCP orientation is not always the same, but determined by the given configuration $\theta_4 \sim \theta_6$.

With partial constraints in this six-axis example, $\theta_4 \sim \theta_6$ are determined based on the input reference configurations, referred to as reference robot poses. These reference robot poses can be designed such that they do not lead to robot collision with a static objects in the environment. The specification of reference robot poses can be done in the following ways: (1) discrete or (2) batch continuous. For the six-axis example, in the discrete case, a reference robot pose is described by the set of configuration parameters $Q_d = \{\theta_1, \theta_2, \theta_3, \ldots \theta_N\}$, where $q_i \forall i=1, 2, 3 \ldots N$.

In the batch continuous case, reference robot poses are described by a discrete batch of continuous sets, depending on the position of the wrist-center of the robot in the workspace. This set can be described as $Q_B = \{Q_{B1}, Q_{B2}, Q_{B3}, \ldots Q_{BN}\}$, where $Q_{Bi} = \{\theta | \theta \in \mathbb{R}^r, p \in \mathcal{P}_i\}$ and is the reference robot pose set associated with the robot wrist center position, belonging to the ith subset where $\mathcal{P}_i \subset \mathbb{R}^3$, where a is the degrees of freedom. Note that the limiting case is a single set $Q = \{\theta | \theta \subseteq \mathbb{R}^r\}$ which is not associated with any particular sampled position.

Although, the reference robot poses requires user specification or analytical pre-processing of the application, the computation(s) associated with specifying reference robot poses are offline and do not impact roadmap computation.

Batch Attraction Function Approach

In this method, the configurations $\theta_4 \sim \theta_6$ can be computed based on the batch continuous representation of RRP. In this representation, multiple user-defined range of reference configurations are provided that depend on the robot wrist center position in the workspace. An example representation of a set of reference robot poses (RRP) is $Q_{Bi} = \{\theta | \theta \in \mathbb{R}^6, \theta_{ref}^{min} \leq \theta \leq \theta_{ref}^{max}, p_{min}^i \leq p \leq p_{max}^i\}$.

The goal is to find $\theta_4 \sim \theta_6$ from the set of $Q_{Bi}$. In one or more embodiments, computation of $\theta_4 \sim \theta_6$ uses an attraction function. For clarity and continuing with the example case of a robot 10 with six revolute joints going in mechanical order from J1 to J6, the complete robot configuration is specified by the set of six joint angles: $C = \{\theta_1, \theta_2, \theta_3, \theta_4, \theta_5, \theta_6\}$ and graph generation according to disclosed techniques uses unconstrained sampling in the sampling frame of reference to determine the values of the first three joint angles, $\theta_1, \theta_2, \theta_3$, i.e., to select points in a sampling space having a dimensionality of three, with each point defined by a specific combination of values for $\theta_1, \theta_2, \theta_3$. At each point, the values of the last three joint angles, $\theta_4, \theta_5, \theta_6$, are constrained in dependence on one or more of the RRP. With the first three joint angles, $\theta_1, \theta_2, \theta_3$, defining the position of the robot 10 in space, the set of values for $\theta_1, \theta_2, \theta_3$, can be understood as defining a partial pose of the robot 10.

With the last three joint angles $\theta_4, \theta_5, \theta_6$, defining the wrist center position of the robot 10, and thus defining the TCP position and orientation, the process can be understood as defining partial poses using unconstrained sampling in the reduced dimensionality represented by the configuration parameters used to define the partial pose, with determination of the remaining configuration parameters needed to define the full or complete poses being constrained as a function of one or more of the RRP, and with those constraints thus limiting or bounding the change in TCP position between nodes of the graph, such that the graph edges provide smooth motion. Of course, as noted, the full set of configuration parameters may be much larger than six, and there may be multiple types of articulations reflected in the full set of configuration parameters, and the generalized approach for a set of M configuration parameters is to take the first one or more of the M configuration parameters as a first subset that defines a partial pose of the robot, use unconstrained sampling to determine the partial poses as graph nodes, and then use RRP-based constraints to determine the values of the remaining subset of one or more configuration parameters for each sampled node.

Turning back to the specific example of using an attraction function in the partial-constraint context, the basic idea behind the attraction function is to find an appropriate RRP in $Q_{Bi}$ that has the closest wrist center position to the sampled node. This attraction function is a scalar nonlinear function that computes the minimum norm of the difference between the wrist center position associated with a given sample point, q with the wrist center position associated with the decision variable, $\theta \in Q$ using forward kinematics. Mathematically, it can be expressed as a nonlinear optimization problem expressed below $$\text{minimize } \left\| fk(\theta^{1:3}) - fk(q_{1-3}) \right\|_2 \quad (1)$$

subject to $$\theta \in Q_{Bi}$$

The decision variable in the optimization problem above is θ. The objective function is a nonlinear forward kinematics mapping. The constraint set $Q_{Bi}$ can be any arbitrary continuous set without invalidating the attraction function approach discussed above. The procedure to solve this problem in the six-axis example context is described below:

(1) Partition the workspace based on the robot wrist center position. For example, a pick and place robot application can be broadly partitioned into the area near the pick, area near the place, and the remaining workspace.
(2) Compute the feasible set of joint configurations for each partition. This computation will typically require specification of the feasible set of robot TCP poses followed by an inverse kinematics mapping to compute the continuous set in joint space. The user can specify the feasible set of robot TCP poses based on the particular application and any associated constraints associated with each partition.
(3) Associate the continuous set $Q_{Bi}$, with each individual partition of the workspace.
(4) Sample p in Cartesian space.
(5) Find set $Q_{Bi}$ associated with sampled p.
(6) Compute $q_{1-3}=[\theta_1, \theta_2, \theta_3]^T$ by using an inverse kinematics (IK) solver given sampled position p (p is defined as the position of the wrist center of robots). $q_{1-3}$ is the IK solution, which is the closest to the given IK reference configuration.
(7) Formulate the optimization problem provided in the Eq (1) with associated constraint set $Q_{Bi}$.
(8) Use the previously sampled node as an initial guess.
(9) Solve the nonlinear optimization with the initial guess in Step 7, using numerical approaches such as interior point method, barrier method, sequential quadratic programming.
(10) Get $\theta_4 \sim \theta_6$ from the solution of the optimization, $\theta_{optimal}$ by taking the $4^{th}$-$6^{th}$ elements.
(11) Add $q=[q_{1-3}^T, \theta_4 \sim \theta_6^T]^T$ to the graph as a node if it is collision-free.

Figure 12:
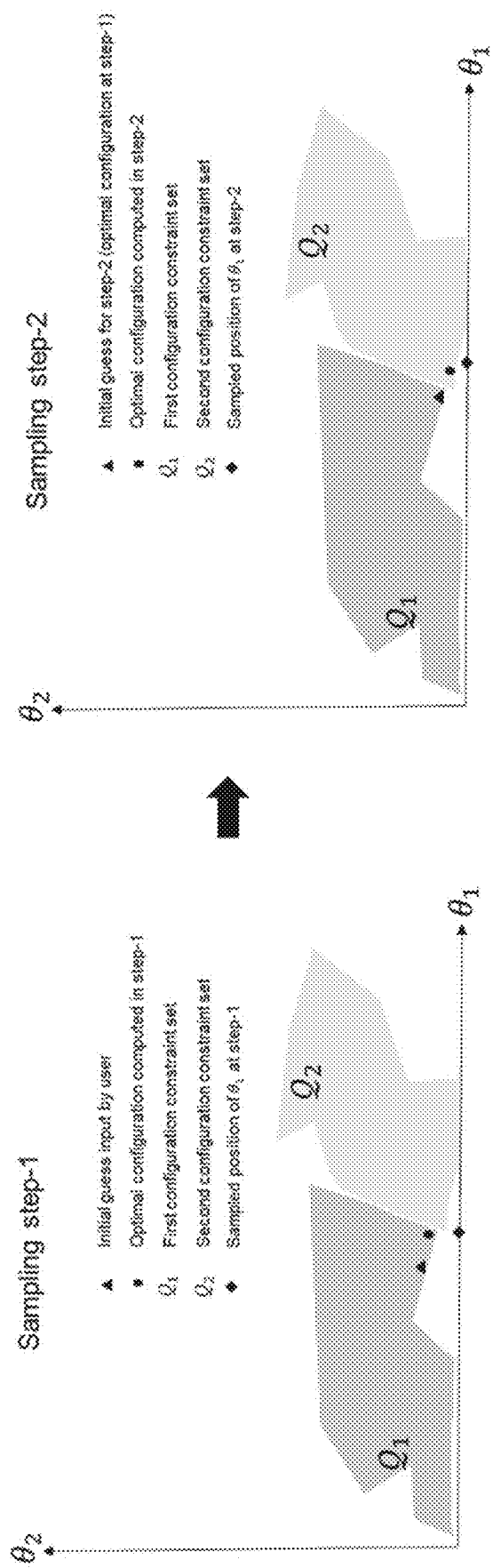
FIG. 12 is a diagram of steps or operations for performing sampling for graph generation with partial constraints applied in the sampling, according to an example embodiment.

A visual illustration of this approach is presented for a 2 DoF system in FIG. 12. In the illustrated example, $\theta_1$ is the sampled position, and the goal is to find an appropriate $\theta_2$ to generate a sampled node, given two constraint sets termed $Q_1$ and $Q_2$. In other words, $\theta_1$ is the sampled position or partial pose and is selected without dependence on the RRP. Determination of the remaining configuration parameter $\theta_2$ is performed on a partial-constraint basis. To solve this problem, a reference robot pose 70 represents something of an initial "guess" and, in one or more embodiments, reference robot poses 70 are user generated inputs. Based on the initial guess(es), the nonlinear optimization problem in Eq (1) is solved. This process is repeated for all sampled positions, with the previously sampled node being used as an initial guess.

The initial guess to the nonlinear optimization is based on the previously sampled node, thereby biasing the search in the direction and proximity of the initial guess. Choosing the previously sampled node as an initial guess to the optimization results in a local minimum solution that is close to the specified initial guess. Due to this particular choice of the initial guess, the rate of change of associated TCP orientation between the neighboring sampled nodes is limited resulting in better path quality. Note that this approach results in a soft guarantee of rate of change of TCP boundedness.

Algebraic Approach

Rather than using the batch attraction approach, an algebraic approach may be used, where the RRP representation is discrete, and the points take finite discrete values. This approach is analytical and computes the partially constrained configuration parameters based on the partial poses and the RRP. That is, for each node, the value(s) of the configuration parameter(s) of the robot that are designated as defining a "partial robot pose" is/are set via unconstrained sampling at a dimensionality corresponding to the number of configuration parameters used to define the partial robot poses. The value(s) of the remaining configuration parameter(s) for each node are then determined in partially constrained fashion, by computing them based on the partial pose and one or more of the RRP.

Again using a six-axis example, each node of the graph is or corresponds to a configuration vector specifying values for the six joint angles $\theta_1, \theta_2, \theta_3, \theta_4, \theta_5, \theta_6$ with the values of the first three joint angles $\theta_1, \theta_2, \theta_3$ at each node determined via unconstrained sampling, and with partially-constrained determination of the remaining joint angles $\theta_4, \theta_5, \theta_6$ for each node, based on the partial robot pose represented by the values for $\theta_1, \theta_2, \theta_3$ and one or more of the RRP. This arrangement for a given node can be expressed as:

$$\theta_4 \sim \theta_6 = f(\theta_{ref}, \theta_{sample})$$

where $f: \mathbb{R}^6 \times \mathbb{R}^3 \to \mathbb{R}^3$ is an analytic function, which takes as input the reference configurations (the RRP) denoted as $\theta_{ref} \in \mathbb{R}^6$ and the sampled node configuration for the first three joints denoted as $\theta_{sample} \in \mathbb{R}^3$. The function $f$ determines $\theta_4 \sim \theta_6$ such that these are close to (but not necessarily equal to) $\theta_{ref}$.

Figure 13:
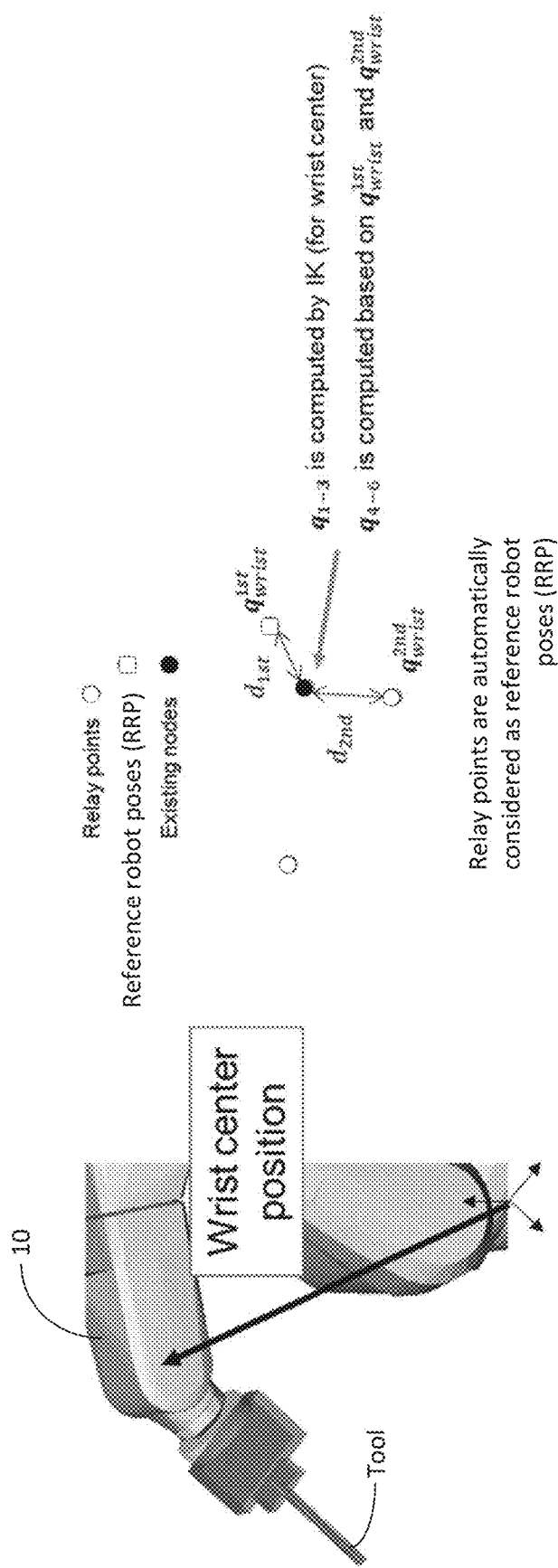
FIG. 13 is a block diagram of a robot illustrating wrist center position in the context of using partial constraints to determine graph nodes, according to an example embodiment.

The idea is to determine $\theta_4, \sim \theta_6$, for each workspace sample point p (not just using a single set of $\theta_4 \sim \theta_6$). A corresponding example procedure in the six-axis context and with reference to FIG. 13 is:

(1) Sample p in Cartesian space.
(2) Compute wrist center position $p_{wrist}^i$ of each reference robot pose $q_{wrist}^i$ by using a forward kinematics solver.
(3) Compute distance $d_i = \|p - p_{wrist}^i\|_2$ and choose the smallest pair $\{d_{1st}, q_{wrist}^{1st}\}$ and the second smallest pair $\{d_{2nd}, q_{wrist}^{2nd}\}$.
(4) Compute $q_{1-3} = [\theta_1, \theta_2, \theta_3]T$ by using an IK solver given sampled position p (p is defined as the position of the wrist center of robots). $q_{1-3}$ is the IK solution, which is the closest to the given IK reference configuration.
(5) Compute $q_{4-6} = [\theta_4, \theta_5, \theta_6]^T$ based on the following equation $$q_{4-6} = \frac{d_{2nd}\mathcal{F}(q_{wrist}^{1st}) + d_{1st}\mathcal{F}(q_{wrist}^{2nd})}{d_{1st} + d_{2nd}}$$

where, F( ) is a function to return a vector of $4^{th}$-$6^{th}$ elements of an input joint configuration.

(6) Add $q=[q_{1-3}^T, q_{4-6}^T]^T$ to the graph as a node if it is collision-free.

$\theta_4$  $\theta_6$

If the workspace sample point is close to some reference robot poses, the TCP orientation of the workspace sample point becomes close to the TCP orientation of the reference point. This leads to the smooth transition making the resulting motion smoother than would be attained by simply freezing a last subset of the configuration parameters at each node. The path quality can also be understood mathematically with the following example. Consider a single dimension case for sampling, where the nodes are sampled uniformly from a start location at the origin to a desired goal location with the total distance being $d_G$. The sampled TCP orientation can be computed from the last three joints as:

$$q_{4:6} = \frac{(d_G - d_1)\mathcal{F}(q_{start}) + d_1\mathcal{F}(q_{goal})}{d_G}$$

where $q_{start}$ and $q_{goal}$ are the two reference robot poses and $d_1$ is the distance of the sampled node to $q_{goal}$.

Consider a perturbation of the linear equation:

$$q_{4:6} + \delta q = \frac{(d_G - (d_1 + \delta))\mathcal{F}(q_{start}) + (d_1 + \delta)\mathcal{F}(q_{goal})}{d_G}$$

where $\delta$ is the perturbation in the sampled node distance to the reference robot pose. The parameter $\delta$ can be determined by the sampling resolution of the roadmap which in one or more embodiments is considered to be uniform, fixed, and deterministic. Therefore, the change in TCP orientation between adjacent nodes of the roadmap expressed as the perturbation $\delta_q$ depends linearly on the sampling resolution and is expressed as $$\delta q = \frac{\mathcal{F}(q_{goal}) - \mathcal{F}(q_{start})}{d_G}\delta.$$

Thus the rate of change of TCP orientation is bounded and determined by the sampling resolution, resulting in a smooth path quality. After the workspace sampling step is done, then added nodes are connected with each other by the k nearest neighbors and each node is connected with each relay point.

Figure 14:
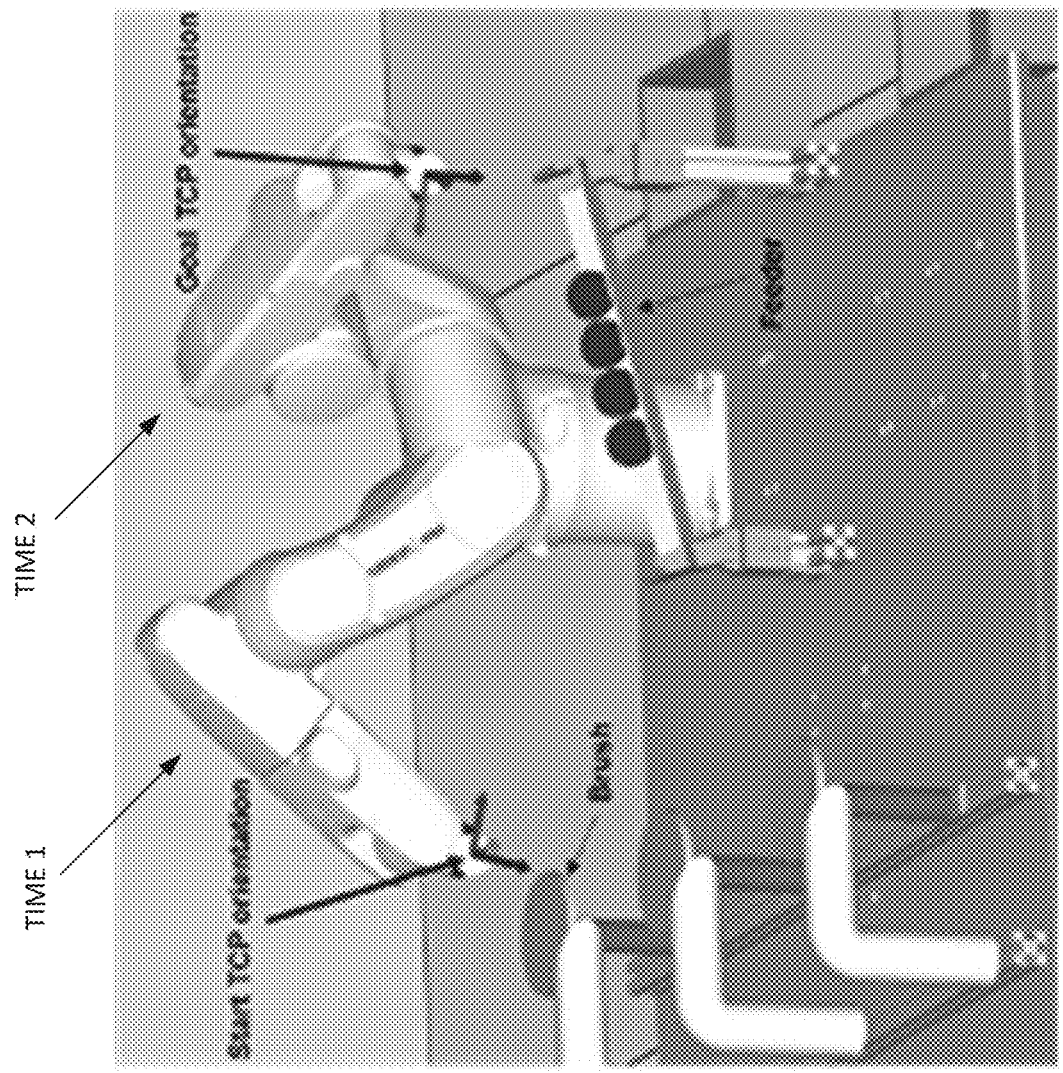
FIG. 14 is a diagram of a robot in an example workspace, illustrating the use of start and goal Tool Center Point (TCP) orientations for determining partial constraints, according to an example embodiment.

FIG. 14 illustrates an application where a 6-DoF robot is required for a deburring application. The robot operations occur near the feeder and the brush region as shown in the figure. Both regions are associated with a different TCP orientation. One approach to generating a graph using the advantageous partial-constraint technique disclosed herein involves the user specifying a set of two or more RRP. One particular choice for the RRP can be the start and goal TCP orientation in joint space, expressed as $q_{start}$ and $q_{goal}$. This approach is one example of what it means for a RRP to be "associated" with one or more tasks to be performed by the robot. For applications with multiple unique start and goal configurations, the user can specify RRP to be the same or close to the robot configuration at all such locations.

Based on the specification of RRP, the sampled node configuration for the last three joints become a weighted sum of the start and goal configuration-based reference robot poses closest to the sampled node position and is expressed as $$q_{4-6} = \frac{d_{2nd}\mathcal{F}(q_{start}) + d_{1st}\mathcal{F}(q_{goal})}{d_{1st} + d_{2nd}}.$$

The start TCP orientation shown in FIG. 14 may be expressed in Euler angles as [90, 90, 0] and the goal TCP orientation as [118.4, 64.4, 2.9] deg. These are, of course, example numbers, and the actual numbers depend on a multiplicity of factors.

Application-Constrained TCP Case

In certain applications, there may be a constraint on the TCP orientation during robot motion between a given start and goal position such that the robot must have the same orientation (termed as $\phi_{constrained}$) at all times between start and goal. It is possible to accommodate such constraints using the disclosed partial-constraint techniques. Particularly, such scenarios can be handled by choosing the range of Q in the attraction function approach detailed above to be a single value ($\phi_{constrained}$). Alternatively, if using the algebraic approach, graph generation may be based on the reference robot poses being equal to $\phi_{constrained}$.

User Interaction with Roadmap Generation

As noted, execution of a roadmap algorithm is one approach to generating a graph for use in online path planning. For roadmap generation, the user needs to specify certain application-specific parameters.

In a first step, the user needs to model the application setup using a commercial modeling tool and generate CAD files. In a second step, the user provides reference robot poses based on application constraints. These reference points can be either discrete or continuous as discussed above in the context of algebraic and batch-attraction approaches. In a third step, the user provides optional relay points. These relay points are joint configurations in proximity to the start and goal operations region. The relay points enable nodes on the roadmap to be connected to configurations near the start and goal region leading to shorter and smoother paths. In a fourth step, the user needs to specify the robot kinematic model, the workspace region (upper and lower bounds of x, y, and z range) as well as the voxel size for the roadmap. The voxel size has a lower limit which is pre-set in the roadmap generation software.

Once the necessary inputs for the roadmap have been generated by the user, the user uses a software program to generate the roadmap. For example, the graph generation function 62 shown in FIG. 3 is part of a software program that is executed by one or more microprocessors.

After the generation of the roadmap, the user validates the roadmap functionality in the following steps:
 (1) The user uses software emulation tools to check roadmap functionality and performance.
 (2) The user optionally modifies certain parameters such as reference robot poses for better performance.
 (3) The user deploys the generated roadmap for path planning in physical robotic cell.

However, as noted, use of roadmap algorithms is only one example of sampling-based approaches to graph generation, and the partial-constraint techniques disclosed herein are applicable to a wide range of sampling scenarios and offer significant improvements over conventional approaches to sampling-based graph generation. In the partial-constraint approach, sampling is limited to a first subset of one or more first ones among the complete set of robot configuration parameters. For example, a robot with M DoF has M configuration parameters, and the first N—going in hierarchical or mechanical ordering—are treated as the first subset, meaning that sampling is limited to generating each node in the graph as a unique combination of values for the first N configuration parameters. These first N values define partial robot poses, and the values for the remaining subset of (M-N) configuration parameters at each node are determined according to a distance function that relates the partial pose to two or more reference robot poses. This "partial constraint" imposed on the values taken on by the remaining subset of configuration parameters at each node bounds the rate of change in TCP orientation between neighboring nodes of the graph, meaning that use of the graph for online path planning results in high quality motion for the robot.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method of online path planning for a robot based on a graph comprising a data structure comprising a collection of nodes and edges, with each node representing a respective robot pose and each edge being a feasible path between a respective pair of the nodes, the method comprising:
   receiving data that specifies a set of two or more reference robot poses associated with task performance by the robot;
   generating each node as a corresponding configuration vector comprising a plurality of vector elements, with each vector element being a value for a corresponding one among a plurality of configuration parameters representing the degrees of freedom (DoF) of the robot, the generation comprising:
      setting a value for each of one or more vector elements in a first subset of the vector elements independent of the set of two or more reference robot poses, the first subset defining a partial robot pose;
      setting a value for each of one or more vector elements in a disjoint second subset of the vector elements according to a distance function that relates the partial robot pose to one or more of the reference robot poses; and
      determining the edges according to path feasibility between respective pairs of the nodes;
   saving the graph to a computer-readable medium; and
   performing online path planning based on the saved graph and correspondingly generating real-time commands causing the robot to move along a path determined via the online path planning.

2. The method according to claim 1, wherein the computer-readable medium is a memory used by an online path planner or a file storage system that is accessed by the online path planner.

3. The method according to claim 1, wherein the robot has M articulation points going in physical order from a first articulation point to a last articulation point, such that each corresponding configuration vector has M vector elements, going from a first vector element to a last vector element, wherein the first subset of vector elements contains the first N of M vector elements, with the second subset correspondingly containing the last (M-N) vector elements, and wherein M and N are integers, with M≥2 and 1≤N<M.

4. The method according to claim 1, wherein the first subset of vector elements defines the configuration of the first N of M joints of the robot, and the second subset defines the configuration of the remaining (M-N) joints of the robot.

5. The method according to claim 1, wherein the generating of the nodes comprises selecting the partial robot poses as points in a reduced-dimensionality space corresponding to a dimensionality of the first subsets.

6. The method according to claim 5, wherein the points are determined according to deterministic sampling or random sampling.

7. The method according to claim 5, wherein the points are selected via execution of a Probabilistic Roadmap (PRM) algorithm.

8. The method according to claim 5, wherein the points are selected via execution of a Rapidly-exploring Random Tree (RRT) algorithm.

9. The method according to claim 1, wherein each node defines a tool center point (TCP) orientation and position, and wherein the distance function bounds the change in TCP orientation along each edge.

10. The method according to claim 1, wherein the set of two or more reference robot poses is a continuous set and wherein the distance function is expressed as a non-linear optimization problem.

11. The method according to claim 1, wherein the set of two or more reference robot poses is a discrete set of reference robot poses and wherein the distance function is an analytic function.

12. A method of operation by an online path planner in controlling motion of a robot within an environment, the method comprising:
   performing a sampling procedure that selects partial poses of the robot within the environment, such that the sampling procedure works at a dimensionality lower than theDegrees of Freedom (DoF) of the robot, each partial robot pose specifying values for fewer than all configuration parameters needed to define a complete pose of the robot within the environment; and
   converting each partial robot pose into a corresponding complete robot pose by, for each partial robot pose, determining values for configuration parameters not accounted for in the partial robot pose according to a distance function that relates the partial robot pose to a set of two or more reference robot poses; and
   taking the complete robot poses as nodes of a graph stored as a data structure held in memory, and determining edges between respective pairs of the nodes, each edge of the graph being a feasible path between a particular pair of the nodes; and
   commanding movement of the robot in real time, to follow a path within the environment determined according to the graph.

13. A computer system for online path planning for a robot based on a graph comprising a data structure comprising a collection of nodes and edges, with each node being a respective robot pose in a sampling frame of reference and each edge being a feasible path between a respective pair of the nodes, the computer system comprising:
   interface circuitry configured to receive data that identifies a set of two or more reference robot poses associated with task performance by the robot; and
   processing circuitry configured to:
      generate each node as a corresponding configuration vector comprising a plurality of vector elements, with each vector element being a value for a corresponding one among a plurality of configuration parameters representing the degrees of freedom (DoF) of the robot, based on:
         setting a value for each of one or more vector elements in a first subset of the vector elements independent of the set of two or more reference robot poses, the first subset defining a partial robot pose;

setting a value for each of one or more vector elements in a disjoint second subset of the vector elements according to a distance function that relates the partial robot pose to one or more of the reference robot poses; and determining the edges according to path feasibility between respective pairs of the nodes;

save the graph to a computer-readable medium; and perform online path planning based on the saved graph and correspondingly generate real-time commands causing the robot to move along a path determined via the online path planning.

14. The computer system according to claim 13, wherein the computer-readable medium is a memory used by an online path planner or a file storage system that is accessed by the online path planner.

15. The computer system according to claim 13, wherein the robot has M articulation points going in physical order from a first articulation point to a last articulation point, such that each corresponding configuration vector has M vector elements, going from a first vector element to a last vector element, wherein the first subset of vector elements contains the first N of M vector elements, with the second subset correspondingly containing the last (M-N) vector elements, and wherein M and N are integers, with M≥2 and 1≤N<M.

16. The computer system according to claim 13, wherein the first subset of vector elements defines the configuration of the first N of M joints of the robot, and the second subset defines the configuration of the remaining (M-N) joints of the robot.

17. The computer system according to claim 13, wherein, with respect to generating the nodes, the processing circuitry is configured to select the partial robot poses as points in a reduced-dimensionality space corresponding to a dimensionality of the first subsets.

18. The computer system according to claim 17, wherein the points are determined according to deterministic sampling or random sampling.

19. The method according to claim 17, wherein the points are selected via execution of a Probabilistic Roadmap (PRM) algorithm.

20. The method according to claim 17, wherein the points are selected via execution of a Rapidly-exploring Random Tree (RRT) algorithm.

21. The computer system according to claim 13, wherein each node defines a tool center point (TCP) orientation and position, and wherein the distance function bounds the change in TCP orientation along each edge.

22. The computer system according to claim 13, wherein the set of two or more reference robot poses is a continuous set and wherein the distance function is expressed as a non-linear optimization problem.

23. The computer system according to claim 13, wherein the set of two or more reference robot poses is a discrete set of reference robot poses and wherein the distance function is an analytic function.

* * * * *